United States Patent [19]

Deleuil

[11] 4,221,599
[45] Sep. 9, 1980

[54] PRESSURE COMPACTING OF SETTABLE GYPSUM/PLASTER COMPOSITIONS

[75] Inventor: Michel Deleuil, Lyons, France

[73] Assignee: Rhone-Poulenc Industries, Paris, France

[21] Appl. No.: 8,070

[22] Filed: Jan. 31, 1979

Related U.S. Application Data

[63] Continuation-in-part of Ser. No. 876,492, Feb. 9, 1978.

[30] Foreign Application Priority Data

Jan. 31, 1978 [FR] France ................................ 78 2598

[51] Int. Cl.² ............................................ C04B 11/14
[52] U.S. Cl. .................................................. 106/111
[58] Field of Search ........................................ 106/111

[56] References Cited

U.S. PATENT DOCUMENTS 3,947,285  3/1976  Jones et al. .......................... 106/111

*Primary Examiner*—James Poer
*Attorney, Agent, or Firm*—Burns, Doane, Swecker & Mathis

[57] ABSTRACT

A settable molding composition comprising a mix of gypsum, plaster, water [which may be provided in whole or in part by utilizing a "wet" gypsum component] and an essentially water-insoluble metallic salt of an organic fatty acid [the "waterproofing" agent] is readily pressure compacted or molded into a variety of useful shaped articles, e.g., modular constructional units and other load-bearing members. The resultant shaped articles are highly water repellent, display excellent mechanical properties, are effectively set even in the absence of any drying step, and are even well suited for certain building elements adapted to be exposed to an outside environment.

27 Claims, No Drawings

PRESSURE COMPACTING OF SETTABLE GYPSUM/PLASTER COMPOSITIONS

CROSS-REFERENCE TO RELATED APPLICATION

This application is a continuation-in-part of my copending application Ser. No. 876,492, filed Feb. 9, 1978, hereby expressly incorporated by reference in its entirety and relied upon.

BACKGROUND OF THE INVENTION

The present invention relates to the pressure compacting or molding of settable gypsum/plaster compositions, and to the shaped articles resulting therefrom, including modular constructional units or building materials, and other load-bearing members, which shaped articles are characterized by excellent mechanical properties and enhanced water repellency.

In one embodiment disclosed and claimed in my aforenoted copending '492 application, there is described the pressure compacting of mixtures essentially consisting of plaster and "wet" gypsum, and wherein the plaster has a Blaine surface of between 500 and 15,000 cm$^2$/g, the "wet" gypsum contains between 15 and 40 parts by weight of water and has a Blaine surface of between 200 and 10,000 cm$^2$/g, and the percentage by weight of the plaster in the mixture of gypsum and plaster is between 30 and 60%, with the ratio by weight of plaster/gypsum being such that the excess of water with respect to that stoichiometrically required for ultimate complete setting of the mix being between 0 and 15% of the total weight of the admixture.

In another embodiment disclosed and claimed in my said '492 copending application, there is described the pressure compacting of gypsum/plaster/water admixtures, wherein the gypsum contains from 0 to 40% by weight of free water, the percentage by weight of the plaster in the mixture of gypsum and plaster being comprised between 60% and 99%, and the total amount of water being such that the free water content of the gypsum together with the added water represents an excess with respect to that amount stoichiometrically required for subsequent complete setting of the mixture of between 0 and 15% by weight with respect to the total weight of said mixture.

The shaped articles and load-bearing members which are obtained consistent with my Ser. No. 876,492 pressure compacting process display mechanical properties similar to those obtained with conventional prefabricated plaster elements, for example, bending strength of 25 to 35 kg/cm$^2$ and a compressive strength of 60 to 80 kg/cm$^2$, when utilizing the subject moist gypsum/plaster admixtures and operating under compacting pressures of less than 100 kg/cm$^2$. Better results are obtained by increasing the weight of the mixture to be compacted and by increasing the compacting pressure, for example, bending strengths of up to 100 kg/cm$^2$ and compressive strengths of up to 400 kg/cm$^2$ are readily attained.

Such resultant shaped articles thus have excellent mechanical, thermal and acoustical insulating properties. It is known, however, that all plaster shaped articles are naturally hydrophilic and display the disadvantage that, if contacted with water, same progressively lose their mechanical properties, this being the reason that external applications of plaster are essentially only coatings oriented, with virtually no use thereof in the field of building materials and load-bearing elements.

Accordingly, there exists a great need in this art to improve the water repellency of gypsum/plaster shaped articles, including those described in my said '492 copending application.

Various attempts have to date been made to render plaster water repellent. Compare the British Pat. Specification No. 380,321; same suggests the application to the surface of plaster or concrete materials of an aqueous solution of a soluble salt of a fatty acid, such as the potassium salt; the salt selected may be applied in solution or in emulsion, and, after drying, provides a water repellent surface.

A suspension-based waterproofing technique has also been proposed, in the French Pat. Application No. 2,345,407. By means of this particular technique, all of the material and not merely its face surfaces is rendered water impermeable, by incorporating during the compounding of the plaster with the water a sealing emulsion comprising asphalt, a wax, a borate and polyvinyl alcohol. The plaster treated in this manner with a water emulsion provides, after setting and drying, certain building materials such as plaster squares.

Hence, it is apparent that the prior art has not succeeded in providing water repellent materials based on plaster by an economically viable process. Frequently, use is made of a waterproofing agent in emulsion or solution; this, however, results in such problems as adequate distribution of the agent throughout the plaster and the necessity for a drying stage.

SUMMARY OF THE INVENTION

Accordingly, a major object of the present invention is to provide a novel, settable plaster composition comprising a mixture of gypsum and plaster, the shaped articles compacted therefrom being well adapted for external use.

Another object of the invention is to provide a process for the pressure compacting of such plaster/gypsum compositions on an industrial scale.

Briefly, according to the present invention, it has now surprisingly been found that a wide variety of useful shaped articles, including modular constructional units and other load-bearing members, all of which being admirably water resistant and displaying excellent mechanical properties, and being adapted for a plurality of external applications, are facilely fabricated by pressure compacting a settable plaster composition comprising a certain intimate plaster/gypsum/water admixture. Said admixture comprises plaster, gypsum, water [which may be provided in whole or in part by utilizing a moist or "wet" gypsum component] and an essentially water insoluble metallic salt of an organic fatty acid [the "waterproofing" agent], and same is facilely shaped into a variety of useful articles simply by charging predetermined amount of the intimate admixture into a mold cavity, pressure compacting same such that the setting thereof is effected in but a very short period of time, and thence merely removing the resultant shaped article from the mold, said resultant shaped article being directly obtained without the need for any drying step or operation.

DETAILED DESCRIPTION OF THE INVENTION

In the description which follows, the various components of the subject settable compositions, and the various proportions thereof, can be thus defined:

As the waterproofing agent, the "essentially water insoluble" metallic salts of organic fatty acids are intended. By the expression "essentially water insoluble" metallic salts of organic fatty acids, there is intended any such salt which is either insoluble or only difficultly soluble in water. The solubility of the salt is, for example, less than 100 mg/l.

Typically, at least one salt of a fatty acid, such as oleic acid, stearic acid, palmitic acid, etc., is selected. The essentially insoluble salts of the fatty acids are selected from the group comprising the salts of calcium, aluminum, barium, lead, magnesium, zinc, copper and nickel.

Advantageously, a calcium, zinc or aluminum stearate is employed.

It is sometimes of advantage to utilize a mixture of the salts of the various fatty acids. Thus, a mixture of those salts above mentioned may conveniently be utilized.

Preferably, calcium stearate is employed.

The origin of the gypsum that may be used according to the invention may differ widely. For example, it is possible to use for the purpose of this invention a synthetic gypsum originating, in particular, from:

[a] The industrial production of acids by the action or attack of sulfuric acid upon a calcium salt; among these processes are mentioned the production of phosphoric acid by the action of sulfuric acid on calcium phosphate, of hydrofluoric acid by the action of sulfuric acid on fluorine, of boric acid and the organic acids, such as citric acid, tartaric acid, etc.;

[b] The production of sodium carbonate by the action of residual calcium chloride on sodium sulfate;

[c] The activation of clays by the action of calcium carbonate on residual aluminum sulfate;

[d] The neutralization of acidic industrial effluents particularly by lime or calcium carbonate. These acid effluents may be of diverse origin, such as, for example, the industrial production of titanium oxide by the sulfate process, the pickling processes utilized in steel production, refining processes, copper or zinc sulfates.

It is also possible to employ native gypsum in accordance with the invention.

In a preferred embodiment according to the invention, a gypsum, hereinafter designated as "phosphogypsum", is used, said phosphogypsum being obtained as the by-product of the manufacture of phosphoric acid by means of the attack of sulfuric acid on phosphate rock, such as that obtained, for example, from Morocco, Togo, Taiba, Brazil, Florida, South Africa, Israel, etc.

Advantageously for purposes of this invention, a phosphogypsum originating from the manufacture of phosphoric acid is used, such as described in French Pat. Nos. 1,125,849 and 1,181,150, or as results from the filtration of the liquid attacking the phosphate, for example, filtration by means of the filter described in French Pat. No. 1,327,693, optionally after same has been subjected to a stage of purification or even neutralization of impurities by chemical means, such as, for example, by alkaline treatment. The purification stage generally comprises simple washing followed by filtering or drying. Concerning the details of the purification operation, particularly by means of hydrocyclones, it is possible to operate in the manner described in French Pat. No. 1,601,411 may be followed.

Also for purposes of this invention, advantageously a phosphogypsum is used which has been subjected to a purification process wherein the acid impurities in synthetic gypsum are neutralized by means of an alkaline reaction, such as with lime. See French Pat. Application No. 75/12,923 for a detailed description of such neutralization.

It is even more preferred to use a washed, hydrocycloned and neutralized gypsum.

The gypsum employed in the process of the invention has a water content of between 0 and 40%: it is of advantage to use the gypsum in a powdery state and to prevent the same from becoming pasty.

It is also advantageous to employ phosphogypsums having a water content comprised between 15 and 40%, and preferably between 20 and 35%.

For the purpose of obtaining a gypsum that is not pasty, use is made of gypsums which are finely divided but which are not ground, which serves to insure maintenance of a powdery state for the gypsum, at the high moisture levels described hereinabove and which are the preferred. The corresponding specific Blaine surface of such gypsums is comprised between 200 and 10,000 cm$^2$/g, and preferably between 200 and 6,000 cm$^2$/g.

Even more preferably, a phosphogypsum having a specific Blaine surface comprised between 1,000 and 4,000 cm$^2$/g, is employed.

The origin of the plaster employed according to the process of the invention may vary extremely widely. Thus, the various α-semihydrate calcium sulfate or β-semihydrate calcium sulfate based plasters may be used. These plasters may contain widely varying proportions of anhydrite II and anhydrite III, and, additionally, the residual gypsum content in such plasters may be up to approximately 15% by weight. In particular, it may be advantageous to employ plasters containing nearly 100% soluble anhydrite III.

According to a particular preferred object of the invention, it is advantageous to employ a plaster having a specific Blaine surface comprised between 500 and 15,000 cm$^2$/g and more preferably of carefully controlled granulometry.

This preferred fine and carefully controlled grain size distribution or granulometry provides a low apparent density, which is particularly advantageous according to the invention. The phosphogypsum plasters are thus highly suited, because same display the characteristics required, either directly, or after simple grinding.

It is preferred to employ a grain size distribution such that the major proportion of the particles will have dimensions comprised between 20 and 100 microns with an average of about 40–50 microns; such a grain size distribution is considered tight or carefully controlled and is characteristic of those plasters derived from the calcination of phosphogypsum.

According to another preferred embodiment of the invention, an especially suitable plaster of phosphogypsum origin, so called phosphoplaster, can be obtained by drying and calcining that phosphogypsum specifically obtained via the aforenoted processes. Various methods for drying and calcination may be employed to produce plaster suitable for attaining the objectives of the present invention, and among these methods there are mentioned those utilizing a continuous rotary furnace which is indirectly heated, a discontinuous, cyclic rotary furnace with indirect heating, a screw calcinator [such as that described, for example, in French Pat. No. 1,601,411], forced air drying and fluidized bed calcination [such as that described in French Pat. Application No. 75/16,119] or a pneumatic type calcination in an apparatus of the type described in French Pat. No. 2,257,326. French Pat. Application No. 75/16,119, supra, specifically relates to a process for the heat treatment of gypsum to convert it into β-semihydrate by means of indirect heating, in a fluidized bed, characterized by the fact that in a continuous combination the continuous fluidization of finely divided gypsum is effected: by means of a gas consisting essentially of air; a gas supply means for fluidization comprised between the minimum theoretical velocity below which the bed remains at rest and approximately six times said velocity; a substantially horizontal entrainment of the material from one end to the other of the fluidized bed, with simultaneous progression of the dehydration reaction; the supply of heat by means of heating elements submerged in the fluidized bed, such that a temperature differential of several times a ten degree Celsius increment, between the average temperature of each heating element and that of the fluidized material is effected; the elimination of the water vapor produced by the reaction; and the recovery at the outlet end of the fluidized bed of a product almost completely transformed into the semihydrate. In the independent heating elements, a continuous circulation of hot fluid is established so as to maintain at the inlet of each heating element an almost constant temperature comprised between 180° and 300° C. At the outlet of each heating element, the temperature of the hot fluid is controlled so that it is 30° to 40° C. less than the inlet temperature, said temperature control being effected by monitoring the flow rate of the hot fluid.

The calcined product obtained contains at least 80% β-semihydrate.

The mixture of gypsum and plaster according to the invention is such that the proportion of by weight of the plaster in said mixture is comprised between 30 and 99%, but preferably between 30 and 60%.

The excess of water required with respect to that stoichiometric amount necessary for the subsequent complete setting of the mixture is comprised between 0 and 15% by weight of the total mixture, and preferably between 2 and 8%.

It should be understood that the excess amount of water is expressed vis-a-vis the weight of the dry mixture [after the setting of the plaster] which corresponds to the weight of the gypsum introduced plus that weight which results upon setting of the plaster, together with the weight of the waterproofing agent.

If the moist gypsum does not contain sufficient water, whether in the form of water physically bonded or superficially adsorbed, water is added, if necessary, to the mixture of gypsum and plaster, so that the excess water is between the aforementioned limits.

Concerning the quantity of the waterproofing agent added, it is typically low and may be comprised, for example, between 0.2 and 2% by weight of the dry mixture, and preferably between 0.5 and 1.5%.

It is also within the scope of the invention to incorporate into the settable compositions various additives, such as: neutralizing agents [lime, calcium carbonate], other waterproofing agents [methyl silicones], reinforcing agents [mineral or organic fibers[, minerals [aluminum sulfate or lime], polymers [urea-formaldehyde resins or polyvinylacetates] and various fillers [gravel or kaolin].

In carrying out the process of the invention, it is necessary to admix the components of the settable mixture well prior to the compacting operation.

There are various possible variants of the preparation of the mixture to be introduced subsequently into the mold cavity.

The waterproofing agent selected is introduced, in powder form, by adding it initially to the plaster; in this case, the plaster with the waterproofing agent added is then mixed with the moist plaster and, if necessary, the supplemental water required is added as an atomized spray.

This atomized spray of supplemental water is utilized particularly when the gypsum to be employed is either dry or is insufficiently moist; in this case, the water required may be added either to the gypsum before mixing, or after having mixed the dry or insufficiently moist gypsum and the plaster together, at mold level, immediately preceding the compacting operation.

In another embodiment of the invention, the waterproofing agent is incorporated at the same time as the plaster is admixed with the gypsum.

Subsequently, the water is added, if necessary.

The mixing operation may be performed by any known means, for example, with the aid of a turbine or helical type agitator, or a ploughshare type mixer.

The preferred embodiment of the invention consists of premixing the plaster and the waterproofing agent: the slight difference in grain size between the two powders provides for a good distribution of the waterproofing agent throughout the plaster.

The resulting admixture is pressure compacted consistent with those parameters outlined in the copending application, Ser. No. 876,492.

The compacting pressures employed in the preferred embodiment of the invention described in said '492 copending application are comprised between 30 and 100 kg/cm$^2$; it is apparent that by employing even higher pressures, interesting materials are also obtained. This invention is thus not limited to the utilization of the preferred pressures; the subject process may therefore be conducted using pressures in excess of 100 kg/cm$^2$.

The only criterion governing the upper limit on the pressure is the production of a homogeneous material. Typically, pressures of less than 200 kg/cm$^2$ are applied.

The pressures may be applied either on a single plane or simultaneously on different planes. It may be of advantage to precompact the mixture.

The time of the application of pressure may vary, but it has been found that typically rather short times of pressure duration, for example, on the order of 15 to 90 seconds, and even less than 15 seconds, immediately produce shaped articles capable of being handled and manipulated. This speed makes it possible to manufacture objects having good properties, at high rates, and circumscribes an especially attractive feature from an industrial point of view, and one particularly interesting aspect of the invention.

One preferred embodiment of the invention shall now be presented, said embodiment providing shaped articles having excellent mechanical properties and enhanced water repellency and consisting of:

[i] Preselecting:
(a) a phosphoplaster having a specific Blaine surface of 2,000 to 5,000 cm$^2$/g;

(b) a moist phosphogypsum containing 15 to 40% by weight of water and having a specific Blaine surface of 1,000 to 4,000 cm²/g;
(c) the percentage by weight of the phoshoplaster in the phosphogypsum and phosphoplaster mixture being comprised between 30 and 60%;
(d) the excess water with respect to that stoichiometric amount necessary for the subsequent complete setting of the mixture being comprised between 2 and 8%; and
(e) a metallic salt of stearic acid added in amounts of from 0.2 to 2% by weight of the mixture.

[ii] First admixing the metal salt of stearic acid and the phosphoplaster, then adding the moist gypsum and the optional atomizing spray of water, if necessary;

[iii] Placing the mixture into the mold cavity;

[iv] Applying a compacting pressure of less than 200 kg/cm²; and

[v] Removing the thus shaped article from the mold.

The product and process immediately above described are not limitative, but reflect only the most economical features of the invention.

The process of the invention and, particularly, its immediately above described preferred embodiment provides for the production of shaped articles, especially modular constructional units and other load-bearing members, which are uniformly homogeneous and water repellent throughout.

It is indeed surprising that such minor amounts of the waterproofing agent permit attainment of complete water repellency without at least some sites of preferential water uptake, such as those which typically result upon compacting plaster admixtures in a mold cavity.

The shaped articles prepared according to the invention are highly water repellent; moreover, virtual complete preservation of mechanical properties is maintained.

Also, such shaped articles display but slight sensitivity to freezing conditions.

Another advantage noted consists of the fact that the waterproofing agents selected are compatible with the gypsum and plaster starting materials, having the grain sizes reflected hereinabove. The introduction of the waterproofing agent in powder form does not inhibit the setting of the plaster.

The incorporation of the waterproofing agent and the dispersion thereof presents no difficulties, because it does not pass through an intermediate stage of a suspension or a paste, as in the processes known to the prior art.

Another advantage is that, if it is preferred to effect the compacting and waterproofing in the presence of a neutralizing agent, as is sometimes the case when, by a known method, certain residual acid phosphogypsums or phosphoplasters are trested, the incorporating of the waterproofing agents as per the invention is facilitated.

During operation of the process according to the invention, another unexpected result is observed: the pressure required to compact a given weight of the powder mixture to a given volume is very appreciably reduced.

The economy achieved by reduction in the pressure necessary for compaction is even greater when higher compacting pressures are exerted; this favors the production of shaped articles which are in and of themselves water repellent.

The subject process too is economical because it does not require any drying step.

The water repellent shaped articles obtained by the process of the invention are admirably well suited for applications in the fields of load-bearing elements [walls, load-bearing partitions], external constructional units [facing panels], flooring elements, etc., and in general as any materials simultaneously requiring good water resistance and enhanced mechanical properties.

The geometry of the mold cavity utilized in the process of the invention yields materials so well adapted as structural elements that load-bearing walls may be readily constructed. The shaped article has finished surfaces, and walls obtained in this manner need no plaster coating, but require only a simple coat of paint.

In order to further illustrate the present invention and the advantages thereof, the following specific examples are given, it being understood that same are intended only as illustrative and in nowise limitative.

In the examples which follow, and in order to determine the degree of waterproofing of the resultant shaped articles, as well as the various mechanical properties thereof, test specimens having the dimensions of 4 cm × 4 cm × 16 cm were prepared.

The procedure for the specimen preparation was as follows:

[i] A homogeneous mixture of plaster, gypsum and the waterproofing agent was prepared consistent with those operating conditions above outlined;

[ii] The resultant mixture was placed into a mold cavity without being subjected to tamping or vibration;

[iii] The mixture was compressed to the desired final volume; this operation was conducted for approximately 15 seconds and required the application of a certain pressure, hereinafter defined;

[iv] Immediately thereafter the specimen was removed from the mold cavity;

[v] The resultant shaped article was left to stand in free air;

[vi] The degree of waterproofing was measured by immersion of said shaped article in water, on the one hand, and, on the other, by contacting same with water by means of capillarity, on a bed of moist sand; the weight of the water taken up in this manner was measured in both cases;

[vii] Two specimens were prepared for each test: one was used as the control and served to determine the bending strength and the compressive strength of the dry material, while the other was tested in contact with water; and

[viii] The mechanical properties of the resultant shaped articles were compared, both before and after conducting the waterproofing tests described hereinabove.

In the presentation of the various results obtained, the following designations are used:

[1] % Plaster: the percentage of plaster in the dry plaster + gypsum mixture;

[2] % Excess Water: the percentage of excess water with respect to the dry mixture after the setting of the plaster;

[3] % Waterproofing Agent: the percentage of the waterproofing agent with respect to the dry mixture after the setting of the plaster;

[4] Pc: the compacting pressure;

[5] Fs: the bending strength of the specimen dried at ambient temperature for from 24 hours to 72 hours until a constant weight was attained;

[6] Fh: the bending strength of the specimens placed on a sand bed for 72 hours, at ambient temperature; the specimen was broken in the moist state;

[7] Fi: the bending strength of the specimen after being submerged in water for 24 hours, then left to stand for 24 hours at ambient temperature;

[8] Cs: the compressive strength of a specimen dried at ambient temperature for from 24 hours to 72 hours, until a constant weight was attained;

[9] Ch: the compressive strength of a specimen placed on a sand bed for 72 hours at ambient temperature;

[10] Ci: the compressive strength of a specimen immersed in water for 24 hours, then left to stand for 24 hours at ambient temperature;

[11] % Rc: the weight of water with respect to the dry specimen; this water results from the capillary uptake after contact with the bed of moist sand; and

[12] % Ri: the weight of water with respect to the weight of the dry specimen; this water results from capillary uptake due to immersion in water.

EXAMPLE 1

A moist gypsum having a free water content of 24.1% was subjected to the following tests after variously incorporating certain amounts of Al, Zn and Ca stearates. The gypsum was derived via the sulfuric acid attack on Moroccan phosphate rock, as per the French Pat. No. 1,125,849; its specific Blaine surface in the dry state was 1200 cm$^2$/g.

The plaster employed was a semihydrate produced by calcination of the aforementioned gypsum, according to French Pat. No. 2,257,326, without additional grinding. Its specific Blaine surface was 3600 cm$^2$/g.

The stearate and the plaster were first mixed, then the gypsum was introduced and agitation continued for 1 min, 30 sec, in a planetary blender.

The mixture was thereafter placed in a mold cavity and compacted.

For the sake of comparison, an experiment was performed without the stearate (Test 1a).

Two specimens having the dimensions 4×4×16 cm were prepared per test, one serving as the control and the other being that specimen to be placed in contact with water.

After compacting, the specimens were left to stand for 24 hours in ambient air.

The mechanical properties of the control were determined and the other specimen was placed on a bed of moist sand for 72 hours.

The mechanical properties were then measured in the dampened state.

The proportions of the different components, the test conditions and the results obtained are compiled in the following Table I:

TABLE I

| Test Number | Nature Of The Water | % Plaster | % Excess Water | % Waterproofing Agent | Control Pc kg/cm$^2$ | Fs kg/cm$^2$ | Cs kg/cm$^2$ | After 72 hours On A Bed Of Moist Sand % Rc | Fh kg/cm$^2$ | Ch$_2$ kg/cm$^2$ |
|---|---|---|---|---|---|---|---|---|---|---|
| 1a | Without Stearate | 56.5 | 0.02 | 0 | 158 | 78 | 166 | 16 | 19 | 41 |
| 1 | With Aluminum Stearate | 55 | 0.27 | 1.36 | 100 | 71 | 142 | 2.4 | 88 | 190 |
| 2 | With Zinc Stearate | 55 | 0.27 | 1.36 | 95 | 75 | 152 | 2.1 | 80 | 172 |
| 3 | With Calcium Stearate | 55 | 0.27 | 1.36 | 100 | 68 | 139 | 2.0 | 83 | 152 |

EXAMPLE 2

This example was performed as in the preceding example, and wherein the stearate selected in the aforementioned Example 1 was replaced with an approximately equal proportion by weight of a mixture of calcium stearate, oleate and palmitate.

The results obtained were equivalent to those attained in Example 1.

EXAMPLE 3

A series of four tests were performed, by incorporating calcium stearate into the gypsum and plaster and according to the procedure of Example 1. As before, two specimens were prepared for each test, one to serve as the control and the other to be subjected to the water contact test.

Test 1a was performed without a waterproofing agent.

The conditions employed in these tests are compiled in Table II.

TABLE II

| Test Number | % Of Plaster | % Excess Water | % Waterproofing Agent | Density | Pc | Control Fs | Cs | After 72 Hours On A Bed Of Moist Sand % RC | Fh | Ch | After Immersion Fi | Ci | % Ri |
|---|---|---|---|---|---|---|---|---|---|---|---|---|---|
| 1a | 63.4 | 2 | 0 | 1.78 | 226 | 88 | 195 | 15 | 31 | 61 | 34 | 83 | 10 |
| 1 | 63.4 | 2 | 1.5 | 1.74 | 177 | 79 | 166 | <0.5 | 56 | 126 | 56 | 157 | 0.5 |
| 2 | 63.4 | 2 | 1.5 | 1.50 | 96 | 53 | 82 | <0.5 | 38 | 71 | 41 | 86 | 0.5 |
| 3 | 81.4 | 2 | 1.5 | 1.73 | 128 | 84 | 163 | 0.6 | 33 | 88 | 45 | 140 | 0.5 |
| 4 | 81.4 | 2 | 0.4 | 1.73 | 144 | 80 | 181 | 16.9 | 18 | 35 | 23 | 60 | 12.4 |

Tests 1 and 2 had the same percentage of contents, but Test 2 was performed with a lower compacting pressure; it will be seen that its mechanical properties are lower and water uptakes are slightly higher, however, the preservation of properties was good.

Tests 2 and 3 were performed with identical amounts of stearate, but with different plaster and gypsum contents; Test 3, which utilized more plaster, reflects better initial properties but higher water absorption and diminished preservation of properties; Test 4, which additionally reflects a very low amount of stearate (0.4%) displays high water absorption.

EXAMPLE 4

A series of tests was conducted utilizing gypsums and plasters of natural origin, with or without the waterproofing agents.

The gypsum was of natural origin and originated from the quarry of CORMEILLES (France). It was finely ground to obtain a specific Blaine surface of 1300 cm$^2$/g. Its free water content was less than 0.5% by weight.

The plaster employed was a semihydrate resulting from the calcination of a gypsum of the same origin and same was ground to obtain a specific Blaine surface of 7,000 cm$^2$/g. Its weight loss at 135° C. was 6.2% by weight.

The setting times (French National Standard B 12402) of a specimen comprising a plaster slurry reflecting a ratio of water/plaster of 0.9 were:
Time to onset of setting: 5 min;
Time to final setting (measured with Vicat needle 200): 11 min, 45 sec.

The pH of a 20% by weight plaster suspension in exchanged water was 8.2

The waterproofing agent was calcium stearate.

The procedure followed was as described hereinafter:

The plaster was introduced into a plough type mixer (designated Lodige) followed, if necessary, by mixing therein the waterproofing agent.

The gypsum was then added to the mixer.

The water required to set the plaster was then added to the mixer by means of an atomized spray.

Following attainment of a homogeneous mixture, the wet powder was poured into a mold and the compacting pressure necessary to obtain the desired density was applied.

A plurality of specimens were prepared and subjected to the tests described hereinabove.

The test conditions and the results obtained are compiled in Table III.

EXAMPLE 5

A series of tests was performed according to the operating procedure described in Example 4, but utilizing a phosphogypsum and a phosphoplaster derived from Moroccan phosphate rock.

The gypsum utilized was a phosphogypsum derived from Moroccan phosphate rock and having a specific Blaine surface of 1,500 cm$^2$/g and a free water content of 24%.

The plaster employed was a phosphoplaster resulting from the calcination of a phosphogypsum of the same origin. Its specific Blaine surface was 3,200 cm$^2$/g. Its weight loss at 135° C. was 6.1% by weight. The setting times of a specimen of plaster slurry having a ratio of water/plaster of 0.9 were:
Time of onset of setting: 3 min, 15 sec;
Time to final setting: 9 min, 35 sec.

The pH of a plaster suspension comprising 33% by weight of plaster in exchanged water was 3.6.

The proportion of insolubles in a suspension of 33% by weight of plaster in a solution of exchanged water containing 24 g/l sodium chloride was 4%.

The waterproofing agent employed was calcium stearate.

The details of the test conditions and the results obtained are compiled in Table IV.

TABLE IV

| Test Number | % Plaster | % Excess | % Waterproofing Agent | Density | P c | Density F s | C s | After 72 Hours On A Bed of Moist Sand % R c | F h | C h |
|---|---|---|---|---|---|---|---|---|---|---|
| 1 | 57 | 2 | 0 | 1.61 | 182 | 56 | 168 | 16 | 18 | 62 |
| 2 | 57 | 8 | 0 | 1.60 | 205 | 58 | 175 | 17 | 24 | 75 |
| 3 | 57 | 2 | 0.5 | 1.59 | 80 | 40 | 120 | 13 | 28 | 75 |
| 4 | 57 | 2 | 1 | 1.59 | 71 | 45 | 105 | 8 | 28 | 70 |
| 5 | 57 | 2 | 1.5 | 1.59 | 64 | 25 | 76 | 4 | 34 | 75 |
| 6 | 57 | 8 | 0.5 | 1.59 | 70 | 54 | 132 | 12 | 31 | 65 |
| 7 | 57 | 8 | 1 | 1.59 | 80 | 45 | 115 | 7 | 25 | 75 |
| 8 | 57 | 8 | 1.5 | 1.59 | 77 | 28 | 110 | 4 | 31 | 90 |

EXAMPLE 6

A series of tests was performed in a manner identical with Example 5, with a phosphogypsum and a phosphoplaster from Moroccan phosphate rock having the following characteristics:

The gypsum was a phosphogypsum from Moroccan phosphate rock having the specific Blaine surface of 1800 cm$^2$/g and a free water content of 16.5%.

The plaster was a phosphoplaster resulting from the calcination of a phosphogypsum of the same origin. Its specific Blaine surface was 3,300 cm$^2$/g. Its weight loss at 135° C. was 6.4% by weight. Setting times of a slurried plaster specimen displaying a ratio of water/plaster of 0.9 were:

TABLE III

| Test Number | % Plaster | % Excess Water | % Waterproofing Agent | Density | P c | Control F s | C s | Hours On A Bed Of Moist Sand % R c | F h | C h |
|---|---|---|---|---|---|---|---|---|---|---|
| 1 | 55 | 2 | 0 | 1.65 | 190 | 50 | 189 | 21 | <5 | <15 |
| 2 | 55 | 8 | 0 | 1.63 | 210 | 73 | 148 | 22 | <5 | <15 |
| 3 | 55 | 2 | 0.5 | 1.61 | 80 | 50 | 100 | 20 | 8 | 15 |
| 4 | 55 | 2 | 1 | 1.61 | 80 | 48 | 105 | 20 | 8 | 20 |
| 5 | 55 | 2 | 1.5 | 1.59 | 84 | 46 | 95 | 20 | 6 | 25 |
| 6 | 55 | 8 | 0.5 | 1.59 | 110 | 40 | 120 | 18 | <5 | <15 |
| 7 | 55 | 8 | 1.0 | 1.59 | 93 | 38 | 100 | 18 | <5 | <15 |
| 8 | 55 | 8 | 1.5 | 1.58 | 141 | 39 | 60 | 18 | <5 | <15 |

Time to onset of setting: 4 min, 20 sec;
Time to final setting: 12 min, 45 sec.

The pH of a 29% by weight plaster suspension in exchanged water was 3.9.

The proportion of insolubles in a 33% by weight suspension in an exchanged water solution containing 24 g/l sodium chloride was 1.5%.

Results are compiled in Table V.

TABLE V

| Test Number | % Plaster | % Excess Water | % Waterproofing Agent | Density | P c | Control F s | C s | After 72 Hours On A Moist Sand Bed % R c | F h | C h |
|---|---|---|---|---|---|---|---|---|---|---|
| 1 | 53 | 2 | 0 | 1.62 | 182 | 56 | 168 | 16 | 14 | 35 |
| 2 | 53 | 8 | 0 | 1.61 | 205 | 58 | 175 | 17 | 18 | 45 |
| 3 | 53 | 2 | 0.5 | 1.64 | 90 | 30 | 110 | 7.6 | 29 | 70 |
| 4 | 53 | 2 | 1 | 1.63 | 84 | 37 | 95 | 0.9 | 40 | 70 |
| 5 | 53 | 2 | 1.5 | 1.63 | 84 | 29 | 72 | 0.9 | 31 | 60 |
| 6 | 53 | 8 | 0.5 | 1.72 | 115 | 67 | 150 | 4 | 40 | 100 |
| 7 | 53 | 8 | 1 | 1.70 | 96 | 42 | 85 | 1.7 | 40 | 85 |
| 8 | 53 | 8 | 1.5 | 1.70 | 115 | 38 | 65 | 0.6 | 43 | 80 |

EXAMPLE 7

This example was conducted in the manner described in Example 4, and illustrates the use of a phosphogypsum and a phosphoplaster from Togo phosphate rock.

The gypsum employed was a phosphogypsum derived from Togo phosphate rock having a specific Blaine surface of 1,200 cm$^2$/g, and a free water content of 18%.

The plaster employed was a phosphoplaster resulting from the calcination of a phosphogypsum of the same origin. Its specific Blaine surface was 2,200 cm$^2$/g. It loss of weight at 135° C. was 5.61% by weight. The setting times of a slurried plaster specimen displaying a ratio of water/plaster of 0.9 were:

Time to onset of setting: 1 min, 30 sec;
Time to final setting: 1 min, 30 sec;
Time to final setting: 3 min, 30 sec.

The pH of a 20% by weight plaster suspension in exchanged water was 5.8.

The proportion of insolubles in a suspension of 33% by weight of plaster in a solution of exchanged water containing 24 g/l sodium chloride was 4%.

The waterproofing agent utilized was calcium stearate.

Results are compiled in Table VI.

TABLE VI

| Test Number | % Plaster | % Excess Water | % Waterproofing Agent | Density | P c | Control F s | C s | After 72 Hours On A Bed Of Moist Sand % R c | F h | C h |
|---|---|---|---|---|---|---|---|---|---|---|
| 1 | 54 | 2 | 0 | 1.63 | 146 | 50 | 150 | 13.5 | — | 90 |
| 2 | 54 | 8 | 0 | 1.65 | 160 | 48 | 145 | 14 | — | 95 |
| 3 | 54 | 2 | 0.5 | 1.61 | 96 | 40 | 120 | <0.05 | 35 | 115 |
| 4 | 54 | 2 | 1 | 1.61 | 109 | 28 | 105 | <0.5 | 35 | 110 |
| 5 | 54 | 2 | 1.5 | 1.62 | 96 | 18 | 75 | <0.5 | 25 | 85 |
| 6 | 54 | 8 | 0.5 | 1.68 | 109 | 40 | 135 | <0.5 | 28 | 135 |
| 7 | 54 | 8 | 1 | 1.68 | 96 | 35 | 115 | <0.5 | 47 | 135 |
| 8 | 54 | 8 | 1.5 | 1.68 | 93 | 19 | 85 | <0.5 | 33 | 100 |

It will be seen in light of Examples 4 to 7 that the mechanical properties and the degree of water repellency vary as a function of the origin of the gypsum and plaster used.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A settable molding composition, which comprises a particulate, intimate admixture of (1) finely divided, powdery plaster, (2) a finely divided powdery water donor therefor selected from the group consisting of gypsum powder having a given content of free water and a mixture of gypsum powder and free water, the total amount of water present being at least that amount stoichiometrically required for complete setting of the admixture, and (3), uniformly homogeneously distributed therethrough, a minor amount of a finely divided waterproofing agent, said agent being an essentially water-insoluble metallic salt of an organic fatty acid.

2. The settable molding composition as defined by claim 1, wherein the gypsum has a specific Blaine surface of 200 to 10,000 cm$^2$/g and a water content of from 0 to 40% by weight.

3. The settable molding composition as defined by claim 1, wherein the gypsum is a moist phosphogypsum having a specific Blaine surface of 1000 to 4,000 cm$^2$/g and a water content of from 15 to 40% by weight.

4. The settable molding composition as defined by claim 3, wherein the gypsum is a phosphogypsum having been purified by washing, hydrocyclonage and alkaline treatment.

5. The settable molding composition as defined by claim 1, wherein the plaster has a specific Blaine surface of 500 to 15,000 cm$^2$/g.

6. The settable molding composition as defined by claim 1, wherein the plaster is a phosphoplaster having a specific Blaine surface of 2,000 to 5,000 cm$^2$/g.

7. The settable molding composition as defined by claim 1, wherein the fatty acid is selected from the group comprising stearic acid, oleic acid and palmitic acid.

8. The settable molding composition as defined by claim 1, wherein said salt is of a metal selected from the group consisting of calcium, aluminum, barium, lead, magnesium, zinc, copper and nickel.

9. The settable molding composition as defined by claim 1, wherein the metallic salt is selected from the group consisting of the stearates of zinc, aluminum and calcium.

10. The settable molding composition as defined by claim 1, wherein the component (3) comprises a mixture of the metal salts.

11. The settable molding composition as defined by claim 1, wherein the component (3) is calcium stearate.

12. The settable molding composition as defined by claim 1, wherein the amount of plaster is comprised between 30 and 99% by weight of the mixture of gypsum and plaster.

13. The settable molding composition as defined by claim 12, wherein the amount of plaster is comprised between 30 and 60% by weight of the mixture of gypsum and plaster.

14. The settable molding composition as defined by claim 1, wherein the water donor comprises an amount of water which is in excess of that stoichiometric amount required for complete setting of the mix and which comprises between 0 and 15% by weight of the dry mix.

15. The settable molding composition as defined by claim 14, the amount of excess water being between 2 and 8% by weight of the dry mix.

16. The settable molding composition as defined by claim 1, wherein the amount of the component (3) in the mix ranges between 0.2 and 2% by weight of the dry mix.

17. The settable molding composition as defined by claim 16, said amount of the component (3) ranging between 0.5 and 1.5% of the weight of the dry mix.

18. The settable molding composition as defined by claim 1, wherein the component (3) is first added to the plaster (1), and then the plaster/salt admixture is mixed with the gypsum (2).

19. A shaped article comprising the pressure compacted and effectively set, settable molding composition as defined by any of claims 1, 2, 5, 6, 12, 13, 14, 15 or 16.

20. A modular constructional unit comprising the shaped article as defined by claim 19.

21. A load-bearing member comprising the shaped article as defined by claim 19.

22. A method for the fabrication of the shaped article as defined by claim 19, which method comprises intimately admixing the components (1), (2) and (3), charging a mold cavity with same, and thence pressure compacting the settable molding composition to a point of effective set.

23. The method as defined by claim 22, the compacting being done under a pressure of from 30 to 100 kg/cm$^2$.

24. The method as defined by claim 22, the compacting being done under a pressure of up to 200 kg/cm$^2$.

25. The method as defined by claim 22, said pressure compacting being followed by no drying step.

26. The method as defined by claim 22, said pressure compacting being effected in no more than 90 seconds.

27. The method as defined by claim 22, wherein complementary free water component (2) is added to the mix as an atomized spray prior to the pressure compacting thereof.

* * * * *